Dec. 6, 1955     M. A. STICKELBER     2,725,828
BREAD MOLDING MACHINE
Filed Jan. 9, 1950     4 Sheets-Sheet 1
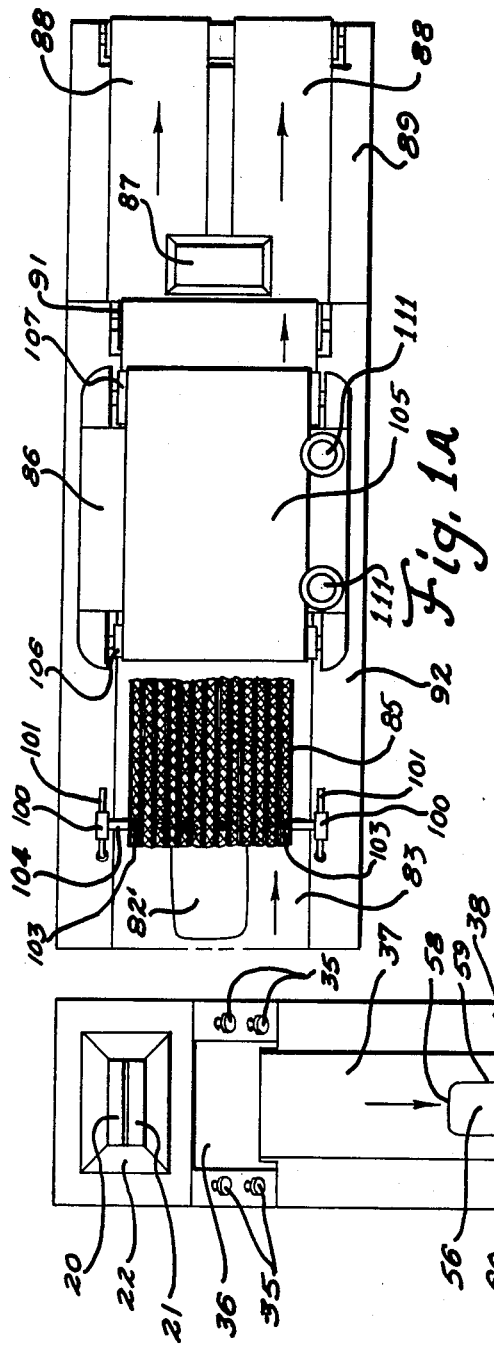
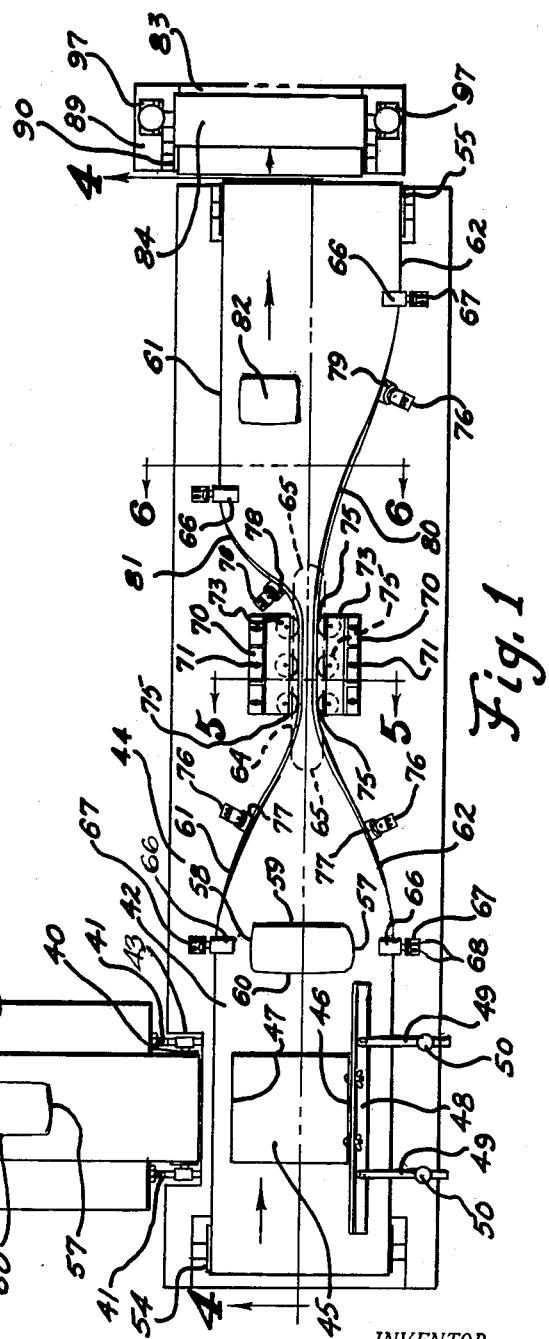
INVENTOR.
MERLIN A. STICKELBER
BY
Alfred R Fuchs
ATTORNEY Dec. 6, 1955  M. A. STICKELBER  2,725,828
BREAD MOLDING MACHINE
Filed Jan. 9, 1950  4 Sheets-Sheet 2
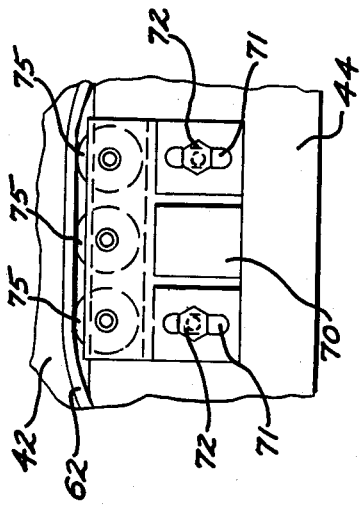
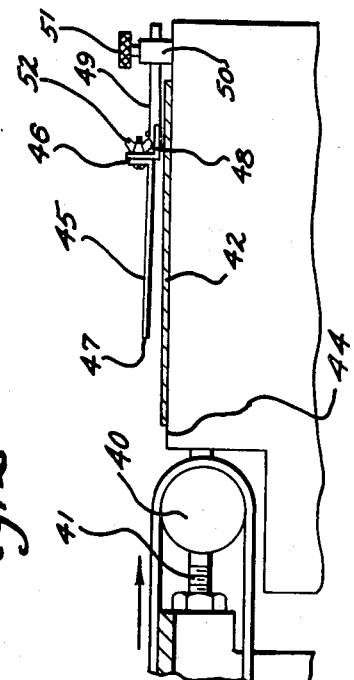
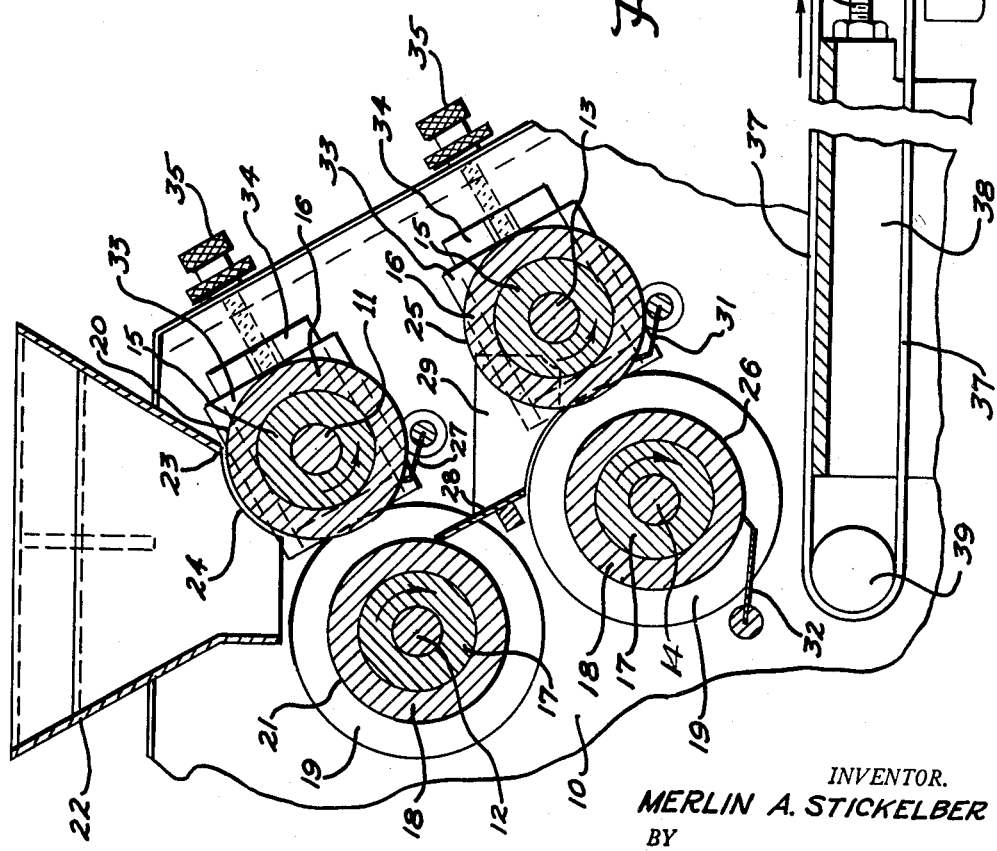
INVENTOR.
MERLIN A. STICKELBER
BY
Alfred R. Fuchs
ATTORNEY

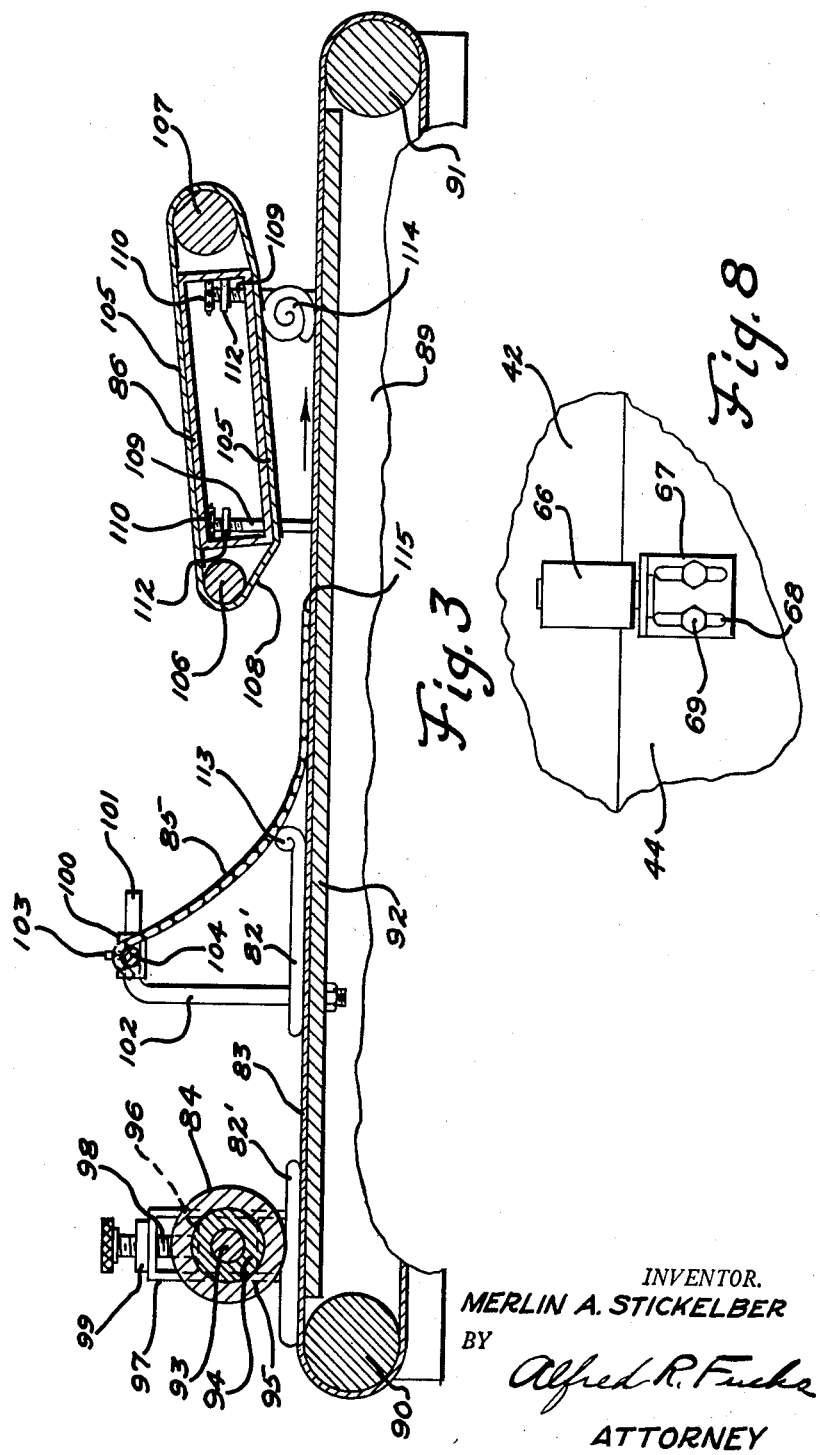

Dec. 6, 1955    M. A. STICKELBER    2,725,828
BREAD MOLDING MACHINE
Filed Jan. 9, 1950    4 Sheets-Sheet 4
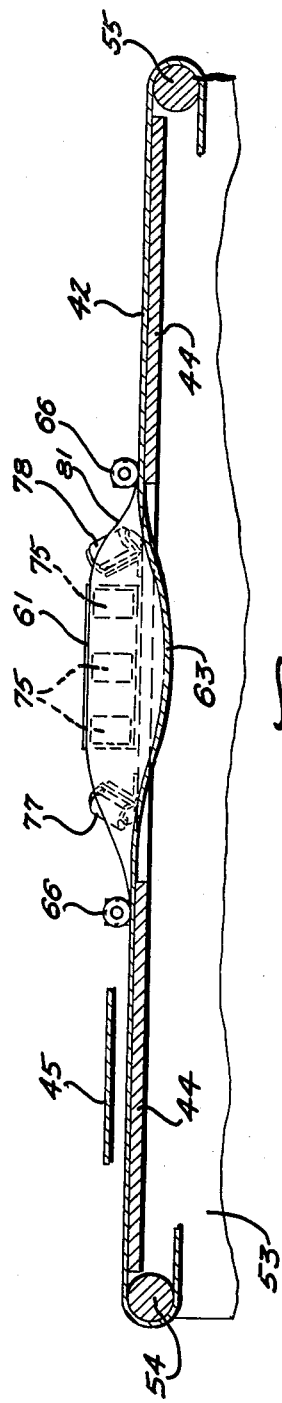
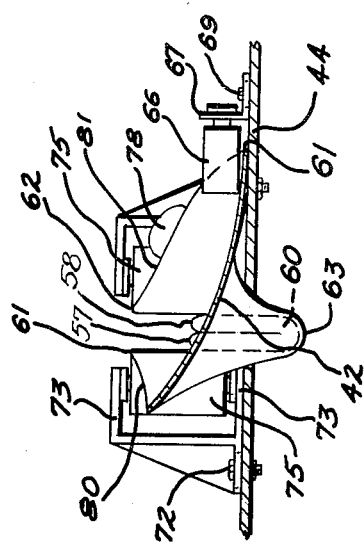
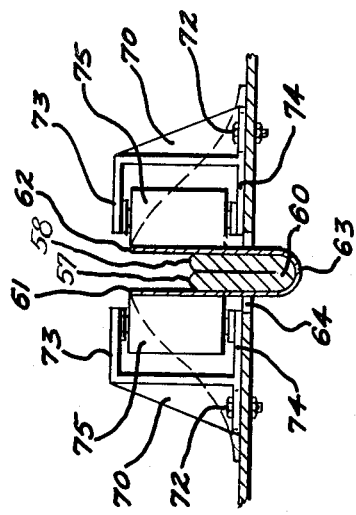
INVENTOR.
MERLIN A. STICKELBER
BY
Alfred R. Fuchs
ATTORNEY

United States Patent Office 2,725,828
Patented Dec. 6, 1955

2,725,828

BREAD MOLDING MACHINE

Merlin A. Stickelber, Kansas City, Mo., assignor to Stickelber & Sons, Inc., a corporation of Missouri Application January 9, 1950, Serial No. 137,659

4 Claims. (Cl. 107—9)

My invention relates to bread molding machines, and more particularly to a loaf forming machine which involves means for sheeting, folding and curling the sheeted dough piece.

In the molding of loaves of bread in a commercial bakery it is customary to sheet rounded pieces of dough between rollers to produce a strip of dough that is elongated in the direction in which the rolling took place. After the dough piece has been sheeted it is curled up on itself to form a loaf. This curling is either done in the same direction as the sheeting took place or crosswise thereof.

In the sheeting of the piece of dough the rolling or squeezing action is progressive along the dough piece always in the same direction during such a sheeting operation. The purpose of the sheeting operation is to squeeze the gas pockets so as to force the gas out of the dough piece or de-gas the same. However, at the same time the mass of the piece of dough that is being sheeted is forced rearwardly from the edge thereof that first went through the sheeting mechanism toward the end thereof that last goes through the sheeting mechanism. This results in the dry skin on the dough piece being broken and the moist dough on the interior thereof being forced to the surface except at the forward end edge thereof, which remains dry on its surface.

When such a dough piece is curled in the same direction in which it was sheeted the end edge having the dry skin thereon will become the first end of the sheeted piece that is being curled up, and the other end edge, which is moist on its surface will become the last end of the piece that is being curled up. This results in the dry portion being in the middle of the curled up dough piece, causing large holes and poor texture in the center of the loaf.

When such a dough piece is curled transversely of the direction in which it was sheeted the dry end edge will become one side edge of the sheeted piece that is being curled up. This results in a loaf that is of very good texture except at one end thereof, because the dry skin portion of the sheeted dough piece will be located at one end of the loaf after it is curled up.

It is the principal purpose of my invention to provide a machine for molding loaves of bread that will avoid the dry portion in and lack of uniformity of texture of a loaf of bread resulting from sheeting dough pieces in one direction and curling the dough pieces after these have been sheeted in only that one direction.

More specifically it is a purpose of my invention to provide a bread molding machine that has sheeting mechanism and curling mechanism with means for folding the sheeted dough pieces discharged from the sheeting mechanism before reaching the curling mechanism so that the moist surfaced and the dry skin coated end edges of the dough pieces, which would be the rear and front edges thereof as discharged from the sheeting mechanism, will be folded into adjacency to each other, and to provide means for pressing the plies of the folded piece of dough together before reaching the curling mechanism, so that the dough pieces will have no dry portion therein.

More specifically my invention comprises means for folding a sheeted piece of dough transversely of the direction of sheeting midway between the forward and rear ends thereof so that the rear and front ends of the dough piece are laid in superposed relation to each other in combination with means for rolling the folded dough piece sufficiently to compact it and press it together to form a single sheet or ply of dough thereof, said folding and compacting or pressing means being provided in advance of the curling means so that the dough piece is curled after it has been folded and compacted to form a sheeted piece of dough of substantially uniform thickness and surface moistness from one end to the other end thereof.

While my invention is shown as being applied to a bread molding machine in which the dough piece, after having been folded and compacted, is curled in a direction transversely to the direction in which it was sheeted, my invention can also be applied to dough pieces that are curled in the same direction as the same were sheeted.

In the particular folding mechanism illustrated in the drawings the folded dough piece is deposited, after having been folded, to one side of the middle of the conveyor belt that carries it toward the curling mechanism and in order to locate the dough piece properly relative to the curling mechanism, it has been found desirable to provide means for adjusting the curling mechanism relative to the conveyor belt that carries the folded pieces of dough toward said curling mechanism. Preferably a curling mechanism is utilized that comprises a flexible member that engages a belt that carries the dough pieces into the curling mechanism and said belt is preferably so mounted that it is adjustable relative to the conveyor belt on which the folded dough pieces are discharged from the folding mechanism. In the form of the invention shown the roller that compacts the dough pieces is shown as being associated with the conveyor belt that said curling means cooperates with, but obviously said roller could as well be associated with the belt that carries the folded dough pieces from the folding mechanism.

In order that the sheeted dough pieces be properly delivered to the folding mechanism so that the dry surfaced end edge thereof is folded into contacting relation with the opposite, moist surfaced edge by the folding mechanism, said sheeted dough pieces must be definitely located on the conveyor belt that carries said sheeted dough pieces to the folding mechanism, and it is a purpose of my invention to provide dough deflecting and stop means in combination with such folding mechanism to locate said sheeted dough pieces properly relative to the folding mechanism to accomplish the folding operation.

It is a specific purpose of my invention to provide a folding mechanism comprising a conveyor belt on which said sheeted dough pieces are located after delivery from the sheeting mechanism, in a definite position, which conveyor belt operates over a table and has portions thereof that travel parallel to the top of said table and a portion between said portions that travel parallel to the table top that are deflected away from the table top so as to bring the marginal side edge portions of the conveyor belt into adjacency to thereby fold the sheeted dough piece. Said deflection of the conveyor belt and return thereof to parallelism to the table top is accomplished by means of rollers that are adjustable relative to each other on opposite sides of the belt and which comprise rollers that rotate about axes that extend perpendicularly to the table top, rollers that rotate about axes that extend parallel to the table top, and rollers that rotate about axes that extend at oblique angles to the table top, and said table top is slotted to accommodate the deflected portion of said belt.

It is a further purpose of my invention to provide such an arrangement of guide rollers for said conveyor belt that the one side edge thereof will reach parallelism to the table top more rapidly than the other side edge thereof, thus causing a transverse inclination of the conveyor belt that is of such a character that the dough pieces that have been folded will be turned over or flopped over always on the same side of the conveyor belt in being restored to a position parallel to the table top in their folded condition.

Other objects and advantages of my invention will appear as the description of the drawings proceeds. I desire to have it understood, however, that I do not intend to limit myself to the particular details shown or described except as defined by the claims.

In the drawings:

Fig. 1 is a top plan view of my improved bread molding machine, showing the major portion thereof.

Fig. 1a is a top plan view of the portion of the machine not shown in Fig. 1 and extending to the right of the portion thereof shown in Fig. 1 in actual practice.

Fig. 2 is a fragmentary vertical sectional view through the sheeting mechanism and the means for delivering and locating the sheeted dough pieces on the folding conveyor belt, a portion of the delivery conveyor from the sheeting mechanism being broken away.

Fig. 3 is a vertical longitudinal sectional view, partly broken away, through the curling conveyor belt, showing the roller for pressing the plies of the folded dough piece together, the curling means and the pressure board cooperating with said curling conveyor.

Fig. 4 is a fragmentary longitudinal vertical sectional view, on a slightly enlarged scale, taken on the line 4—4 of Fig. 1.

Fig. 5 is a transverse sectional view through the folding mechanism, on an enlarged scale, taken on the line 5—5 of Fig. 1.

Fig. 6 is a similar view taken on the line 6—6 of Fig. 1, and

Fig. 7 is a fragmentary plan view, on an enlarged scale, of the folding mechanism.

Fig. 8 is a fragmentary plan view, on an enlarged scale, of the belt guiding and deflecting roller and its adjustable mounting bracket.

Referring in detail to the drawings, my improved bread molding machine comprises a frame having a pair of side walls 10, which are provided with suitable bearings for the shafts 11, 12, 13 and 14 on which the sheeting rollers are mounted. On the shaft 11 is mounted a sheeting roller having a sleeve-like body portion 15 of steel and an outer sleeve-like body portion 16 of a polymer of tetrafluoroethylene, the characteristics of which are described in detail in my application Serial No. 793,359, filed December 23, 1947, now Patent No. 2,699,737, dated January 18, 1955, on Dough Sheeting Apparatus and Method. The steel body portion of the roller 15 is fixed on the shaft 11 and the sleeve-like dough contacting member 16 is fixed on the body portion 15 to rotate therewith.

Mounted on the shaft 12 is a sheeting roller having a sleeve-like steel body portion 17, which is fixed on the shaft 12 to rotate therewith, and mounted on said body portion 17 is an outer sleeve 18 forming the dough contacting surface of the roller, which is made of said tetrafluoroethylene polymer, above referred to. The roller mounted on the shaft 12 has flanges 19 thereon between which the roller on the shaft 11 fits. The roller on the shaft 11 is designated generally by the numeral 20 and the roller on the shaft 12 is designated generally by the numeral 21, said rollers rotating in the direction of the arrows thereon in Fig. 2.

The dough pieces that are to be sheeted between the rollers 20 and 21 are fed to said rollers in any desired manner, as through a hopper 22 to which these may be supplied by any suitable conveying means, or in any other desired manner. The bottom edge 23 of said hopper is spaced from the roller 20 and has a curved edge portion 24, that is also slightly spaced from the roller 20. The dough pieces that are fed to the hopper 22 are rounded dough pieces ordinarily, or may be pieces of dough that have been divided and not rounded, if this is found to be desirable.

The roller on the shaft 13 is made in the same manner as the roller on the shaft 11 and the same reference numerals are applied to the parts thereof as to the roller on the shaft 11. Similarly the roller on the shaft 14 is made in the same manner as the roller on the shaft 12 and the same reference numerals are applied to the parts thereof as to the roller on the shaft 12. The roller on the shaft 13 is designated generally by the numeral 25 and the roller on the shaft 14 is designated generally by the numeral 26. The roller 25 fits between the flanges 19 of the roller 26 and cooperates with the roller 26 in the same manner as the roller 20 cooperates with the roller 21 and said rollers 25 and 26 rotate in the direction indicated by the arrows thereon in Fig. 2.

The dough pieces fed from the hopper 22 pass into engagement with the rollers 20 and 21, and after passing between the rollers 20 and 21 to be sheeted thereby, pass between the rollers 25 and 26. The machine is provided with suitable means for guiding the dough pieces from the rollers 20 and 21 into engagement with the rollers 25 and 26 comprising guide members 27 and 28, which are out of contact with the surfaces of the rollers 20 and 21 and the flange 19 on the roller 26, the guide member 28 having the flanges 29 thereon that are located at opposite ends of the roller 25. A guiding member 31, that is substantially a duplicate of the guiding member 27, is provided for directing the dough pieces away from the surface of the roller 25 as the same are discharged therefrom, and a similar guiding member 32 is provided for guiding the dough pieces sheeted by the rollers 25 and 26 away from the surface of the roller 26.

The shafts 11 and 13 are adjustable toward and away from the shafts 12 and 14 and thus the rollers 20 and 25 are adjustable toward and away from the rollers 21 and 26. The adjustable mounting comprises blocks 33 that are mounted in the side walls 10 of the frame of the sheeting mechanism and have portions that slide in the slots 34 for guiding the same in their adjustment to move the rollers 20 and 25 toward and away from the rollers 21 and 26. The adjustment of the blocks 33 in the slots 34 is accomplished by suitable adjusting means, indicated by the numeral 35 in Fig. 2, said adjusting and guiding means being described in detail in my co-pending application Serial No. 48,042, filed September 7, 1948, on Sheeting Mechanism for Dough Molding Machines, which also shows suitable means for mounting the steel body portions of the rollers on the shafts to fix the same thereon, and for mounting the polytetrafluoroethylene sleeves on the body portions in fixed position, so that the shafts, steel sleeves and polytetrafluoroethylene sleeves of said rollers will all rotate together with the shafts, as will also the flanges 19.

In Fig. 1 the sheeting mechanism is generally indicated by the numeral 36. A conveyor belt 37 receives the sheeted dough pieces from the sheeting mechanism 36, as will be obvious from Fig. 2, the conveyor belt 37 being mounted on a suitable frame 38, on which are mounted the rollers 39 and 40 over which the conveyor belt operates, one of said rollers, such as the roller 39, being driven in any suitable manner in the direction indicated by the arrow thereon in Figs. 1 and 2. The roller 40 is adjustably mounted on the frame, the adjusting means being indicated at 41. Said conveyor belt 37 discharges the pieces of sheeted dough with considerable momentum across the conveyor belt 42 off the end of said conveyor belt 37. Said conveyor belt 37 extends into a recess 43 provided in the table-like member 44, over which the conveyor belt 42 operates.

As the dough pieces are discharged from the end of the conveyor belt 37 onto the conveyor belt 42, these have a tendency to travel somewhat upwardly away from the conveyor belt 42 because of the momentum with which these are discharged from the conveyor belt 37. In order to prevent such undesirable upward movement of the sheeted pieces of dough away from the conveyor belt 42, that might prevent the flatwise engagement of the sheeted pieces of dough with the conveyor belt when these finally engage therewith, a stop plate 45 is provided that is generally rectangular in character. Said stop plate extends across a large portion of the width of the conveyor belt 42 and is generally rectangular in character, having a marginal flange 46 thereon that extends upwardly from the body portion 45 at a slightly oblique angle so that the plate, when secured in position, will have the marginal edge 47 thereof, which is nearest the conveyor belt 37, positioned upwardly above the edge thereof that has the upstanding flange 46, the plate thus inclining upwardly from the flange 46 thereon toward the conveyor belt 37, this being clearly shown in Fig. 2.

The plate 45 accordingly acts as guiding and deflecting means to deflect the sheeted dough pieces downwardly into engagement with the conveyor belt 44 so as to rest flatly thereon. However, due to the fact that the conveyor belt 37 will act differently in its action of throwing the sheeted pieces of dough across the belt 44, dependent upon the stickiness of the dough pieces on the conveyor belt 37 and the condition of the surface of the conveyor belt 37, the leading or forward edge of the dough piece would not always be located at the same place relative to the longitudinal side edges of the belt 42 if some means were not provided for stopping the dough pieces at a predetermined point in their transverse movement across said belt. An angular stop and guide member 48 is accordingly provided to halt the movement of the sheeted dough pieces in their transverse movement across the conveyor belt 42 as they are projected across the same by the conveyor belt 37, said stop member 48 being in the form of an angle member that is pivotally connected with rod-like members 49 that are adjustably mounted in suitable posts 50 provided on the table-like member 44, suitable clamping means 51 being provided for clamping the members 49 in adjusted position.

The upstanding flange of the angle member 48 has the deflecting plate 45 mounted thereon by suitable clamping means 52 and, if desired, the deflecting plate 45 can be mounted for adjustment relative to the angular stop member 48 in the manner disclosed in my application Serial No. 4,294, filed January 26, 1948, on Transverse Curling Loaf Molding Mechanism.

The table-like member 44 is preferably provided on a frame 53, which is provided with suitable bearings for the rollers 54 and 55 over which the conveyor belt 42 operates, one of said rollers being driven in any suitable manner to operate the conveyor belt in the direction indicated by the arrows thereon in Fig. 1. The conveyor belt 37 operates in the direction indicated by the arrows thereon in Figs. 1 and 2 and is located, preferably, just slightly higher than the conveyor belt 42, as will be evident from Fig. 2. In Fig. 1 a sheeted dough piece 56 is shown traveling toward the deflecting and stop means for locating the dough pieces on the conveyor belt 42 and the forward edge of said dough piece is indicated by the numeral 57, the rear edge thereof by the numeral 58, and the side edges thereof by the numerals 59 and 60. Said dough piece will be located on the conveyor belt 42 in substantially the position shown in Fig. 1 after it has been located by means of the deflecting member 45 and the stop member 48 with the two side edges 57 and 58, which were the front and rear edges of the dough piece as it left the sheeting mechanism 36, substantially equally spaced from the side edges of the conveyor belt 42.

The conveyor belt 42 serves as means for feeding the dough pieces to a folding mechanism, and also serves as part of the folding mechanism. The folding means further comprises means for deflecting the side edges of the belt 42 toward each other so as to fold the sheeted piece of dough on itself so that the side edges 58 and 57 are in adjacency to each other. It is immaterial whether the side edge 58 or the side edge 57 is on the bottom, but in the arrangement shown in the drawings the side edge 57 would be on the top after folding has taken place and the side edge 58 would be on the bottom. The side edge 58 having a moist surface after the sheeting operation was completed and the edge 57 having a dry skin coat thereon after the sheeting operation was completed, such folding will put the dry surfaced edge and the moist surfaced edge into adjacency. To get the most perfect results it is desirable that the edges 57 and 58 be in exact alignment to each other, or in other words, that the dough piece be folded on a line that would be midway between the moist surfaced and dry surfaced end edges thereof as sheeted by the sheeting mechanism.

In order to simplify the description of the folding operation, the two margins of the belt are designated, respectively, by the numerals 61 and 62. The means for deflecting the belt comprises guiding means comprising guide rollers, said guide rollers serving to gradually deflect the edges of the belt upwardly until the belt is in such position that the side edges 61 and 62 thereof are uppermost and the mid-portion of the belt is lowermost, such a position for the belt being shown in Fig. 5 and said lowermost portion being indicated by the numeral 63. The belt is gradually deflected from a position parallel to the table top 44 into the position shown in Fig. 5 and then returned to the position parallel to the table top 44 as it moves from left to right in Fig. 1. A slot 64 is provided in the table for accommodating the downwardly extending portion 63 of the belt. If such a slot were not provided, then the belt would tend to be wavy or wrinkled due to its deflection out of its normal position parallel to the table top and would result in deforming the piece of dough instead of merely folding it. The ends of the slot 64 are, preferably, rounded as shown in Fig. 1 at 65. The deflecting of the belt into the position shown in Fig. 5 causes the dough piece 60 to be folded so that the edges 58 and 57 thereof are located in adjacency, as shown in Fig. 5.

The guiding and deflecting means for the edge portions of the belt 42 preferably comprise a pair of rollers 66 that are mounted on suitable brackets 67 provided on said table top 44 to rotate about axes parallel to the table top, said rollers 66 slightly overlapping the edges of the belt, as shown in Fig. 1 and for one of said rollers in Fig. 6, and it will be noted upon reference to Fig. 8 that the mounting brackets 67 are provided with slots 68 receiving the fastening elements 69 so that said rollers 66 may be adjusted toward and away from each other to locate the same in the proper overlapped relation to the edges of the belt 42.

On opposite sides of the slot 64 are provided brackets 70, which are also mounted for adjustment toward and away from each other by providing slots 71 in said brackets receiving the fastening elements 72. Said brackets 70 are provided with a plurality of ears 73 and 74 providing a mounting for rollers 75 so that said rollers are mounted for rotation about vertical axes, or axes perpendicular to the table top 44. In the drawings the number of rollers shown on each of the brackets 70 is three, although the number could be varied as may be found desirable. Said rollers all rotate about parallel axes and said axes are all located in alignment with each other longitudinally of the conveyor belt 42, but the brackets are adjustable toward and away from each other to adjust the spacing of the rollers 75 so as to get the proper amount of deflection of the belt to cause the dough piece 60 to be folded so that the dough piece has the adjacent faces thereof in engagement with each other, as shown in Fig. 5.

In order to control the deflection of the belt between the rollers 66 and the rollers 75, rollers extending at oblique angles to the surface of the table 44 are provided, and said rollers are mounted on brackets that are adjustable on the table top in an oblique direction, as will be obvious upon reference to Fig. 1, said brackets on which said rollers are mounted being indicated by the numeral 76 and there being a pair of said rollers 77 that are located, preferably, in position opposite each other on the belt between the entrance end of the folding mechanism and the rollers 66 located between said folding mechanism and the deflecting and stop means 45 and 46, and a roller 78, which is the same in construction as the rollers 77 and 66, but rotating about an axis extending at an oblique angle to the table top 44 located very close to the folding mechanism 75, and another roller of a similar character, also mounted to rotate about an axis oblique to the table top, which is located at a considerably greater distance from the folding mechanism roller 75, which is indicated by the numeral 79.

The purpose of this arrangement of the rollers 77, 78 and 79, and of the rollers 66, is to cause any upward deflection of the side edges 61 and 62 of the belt to be the same on both sides of the belt during the movement of the dough piece from a position parallel to the table top 44 to the folded position thereof shown in Fig. 5, but to cause a different deflection of the side edge 61 of the belt than that of the side edge 62 of the belt after the folding has taken place, it being obvious that with the roller 66 that engages the edge 61 of the belt to the right of the folding mechanism, as viewed in Fig. 1, much closer to the folding mechanism than the roller 66 that engages the side edge 62 of the belt to the right of said folding mechanism as viewed in Fig. 1, and with the roller 78 extending so as to rotate about an oblique axis still closer to said folding mechanism and also much closer thereto than the roller 79, the edge portion 80 of the belt between said roller 79 and the folding mechanism will be only partly returned to a position toward parallelism with the table top by the time it reaches the roller 79, whereas the side edge portion 81 of the belt will curve or deflect downwardly rapidly toward the roller 66 to the right of said folding mechanism, with the result that the edge 80 opposite said roller 66 will still be almost as high as the edge 62 was when in engagement with the roller 75, while the edge 61 will be in engagement with the table top 44.

This results in the dough piece, which has been folded, the folded dough piece being indicated by the numeral 82 in the drawings, being flipped or flopped over on the side thereof that is to the left in Fig. 5, thus placing the edge portion 58 below the edge portion 57. It is immaterial in which direction this flipping of the dough piece takes place, but it is necessary that it always occur in the same direction, for a reason which will become evident as the description proceeds. The approximate position of the belt 42 when return of the edge 61 to adjacency with the table top 44 has taken place and the portion 80 of the edge 62 is still in a deflected or raised position, is shown in Fig. 6. Between the position thereof shown in Fig. 6 and that shown in Fig. 5, the half of the belt having the edge portion 62 will be in an almost vertical position, as will be obvious from Fig. 6, while the other half of the belt having the marginal edge 61 will already have passed to a position that inclines away from the vertical. This will cause the dough pieces to gradually turn over into the position above described, but due to the rapid travel of the belt 42, this will be substantially a flipping operation.

As a result of the folding operation, the dough piece 82 is to one side of the belt 42 with the dry surface edge in adjacency to a moist surfaced edge. The machine is provided with a conveyor belt 83, which serves to carry the folded dough piece into cooperative relation with a roller for exerting pressure on the dough piece to cause the two plies resulting from the folding operation to adhere to each other and produce a dough piece that is of the same thickness from end to end and from side to side thereof, and which has no dry skin portions therein. This is due to the fact that the moist and dry surface edges are rolled into a unitary mass and the moisture from the moist surfaced dough passes into the dry skin coat, dissolving it. The roller for accomplishing this is shown at 84, and while shown as being in cooperative relation with the belt 83, could be in cooperative relation with the belt 42 at the portion thereof that extends parallel to the table top 44.

Also cooperating with the belt 83 is curling means comprising the flexible curling member 85 that engages the conveyor belt 83 in substantially the manner indicated in Fig. 3, and a pressure board 86 that serves to firmly unite the plies of the curled up piece of dough. The belt 83 delivers the dough pieces to pans 87, which are mounted on pan conveying means comprising a pair of conveyor belts 88.

The pan conveying means delivers the pans 87 to an exact position relative to the side edges of the conveyor belt 83, and it is accordingly necessary to center the sheeted, folded dough piece 82 relative to the conveyor belt 83. In order to make this possible the frame 89 on which the conveyor belt 83 is mounted is separate from the frame 53 on which the conveyor belt 42 is mounted, and is adjustable crosswise of the frame 53. A portion of the frame 89 is shown in Fig. 1 and a portion thereof in Fig. 1a, as Fig. 1a is a continuation of Fig. 1. The conveyor belt 83 is mounted on the frame 89 by means of a pair of rollers 90 and 91, one of which is power driven, to travel in the direction indicated by the arrows on Figs. 1, 1a and 3. Said frame is provided with a table top 92, over which the conveyor belt 83 operates.

The roller 84 operates on the folded dough piece 82 to compress it slightly and firmly secure the plies of the folded dough piece together and squeeze sufficient moisture from the moist surfaced dough adjacent the dry skin coat to dissolve said dry skin. The roller 83 is also preferably made of a material that is inadhesive to dough, preferably, being made of a tetrafluoroethylene polymer, such as described in the above referred to application, Serial No. 793,359.

Said roller 84 is preferably mounted on a shaft 93, upon which a steel sleeve 94 is fixed, and surrounding said sleeve 94 is a sleeve 95 of said polymer of tetrafluoroethylene, which in turn is mounted in fixed position on the steel body portion 94 of said roller. The shaft 93 is mounted in bearing blocks 96, which are slidable in guide grooves in brackets 97, the blocks 96 being free to slide downwardly in the blocks 97 until the roller 84 engages the belt 83. Thus the roller 84 compacts the dough pieces 82 by its weight mainly, but maintains a predetermined thickness for the folded dough piece that is being acted on thereby, due to the provision of stop screws 98, which are adjustable in the brackets 97, and are provided with lock nuts 99 for locking the same in adjusted position.

The flexible curling member 85 is of a chain mesh construction and is adjustable in the usual manner to obtain the desired position thereof on the belt 83 by means of bracket members 100 that are adjustably mounted on the horizontal arms 101 of the upstanding brackets 102 mounted on the frame 89 and by means of adjustment of the chain mesh member 85 on the pins 103 provided on the transverse bar 104 extending between brackets 100.

The pressure board 86 has a belt 105 provided thereon, which actually engages the dough pieces that are acted on by the pressure board, and the belt is adjustable to provide for movement of a clean portion thereof into dough engaging position because of its mounting on the rollers 106 and 107. The roller 106 is smaller than the roller 107 to provide an inclined forward face 108 on the pressure board. The pressure board has a normal tendency to drop down toward the surface of the belt 83, as it is slidably mounted on the posts 109, being limited in its downward movement by engagement with the sprocket wheels 110 on said posts, which serve as means for simultaneously rotating the members 109 by means of the hand wheels 111, sprocket chains, (not shown) being provided between the transversely opposite sprocket wheels 110 to transmit the motion from the hand wheels 111. Rotation of the sprocket wheels 110 causes the stop collars 112 to be adjusted on the posts 109, said stop collars 112 having a threaded connection with the posts 109 and being held against rotation in any well known manner. Said collars 112 serve to limit upward movement of the pressure board.

After the folded dough pieces have had the plies thereof united by means of the roller 84 the same are moved by the conveyor belt 83 into engagement with the curling member 85. The compacted dough piece having no dry portions remaining therein is indicated by the numeral 82' in Figs. 1ª and 3. Also the compacted and united portion of the dough piece 82 is indicated by the numeral 82' in Fig. 3. Said dough piece 82', which has a tacky surface inasmuch as no dusting flour has been applied thereto, throughout the sheeting, folding and compacting operations, engages the flexible curling member 85 and has the end thereof turned over on itself, as shown at 113 in Fig. 3. As the dough piece is carried to the right in Fig. 3 by the conveyor belt 83 it is curled up on itself to produce the curled up or coiled up piece of dough or scroll 114, which is shown in Fig. 3 as being under the pressure board. Said dough piece is completely curled up before it leaves the end 115 of the curling member 85 and passes along the inclined surface 108 of the pressure board to raise the same up, the weight of the pressure board 86 causing the layers or plies of the dough piece 82' that have been curled up into the scroll 114 to be firmly pressed into engagement with each other so as to adhere to each other wherever these engage and form a molded loaf of uniform texture throughout, without any voids or spaces between the plies thereof. If any dusting flour is applied to the dough pieces, it is only applied thereto after it is coiled up sufficiently on itself that only the outer surface of the scroll 114 will have any dusting flour thereon to prevent sticking thereof to the pressure board.

In operation, pieces of dough are fed to the machine by being supplied to the hopper 22, either in a rounded condition or merely divided into loaf size pieces, and passed between the rollers 20, 21, 25 and 26, adjusted to proper position to sheet the same to the desired thickness, the rollers 25 and 26 being ordinarily set closer together for this purpose than the rollers 20 and 21. The dough pieces are then carried by the conveyor belt 37 to the conveyor belt 42 and projected across the same, being deflected by the plate 45 into a flatwise relationship to the conveyor belt 42 and being halted at a predetermined point between the side edges thereof by the stop member 48. The dough pieces are then carried to the folding mechanism by means of the belt 42, said folding mechanism comprising said belt and the rollers 75. The folded dough pieces are then flipped over on one side by the manner in which the belt edges are deflected to travel along the conveyor belt 42 toward the rear thereof, as shown in Fig. 1, and delivered to the conveyor belt 83, the conveyor belt 83 being adjusted so as to place the folded dough piece 82 into a mid-position thereon between its two side edges so that the same will be delivered properly to the pans 87, the conveyor belt 83 having been adjusted relative to the conveyor belt 42 to accomplish this. After reaching the conveyor belt 83 the dough piece 82 passes between the roller 84 and the belt 83 to cause the sticky surfaced plies thereof to be united and to cause the moisture from the sticky, moist surface thereof to pass into and dissolve the dry skin coat to make a sheeted dough piece having no dry portion therein, which is designated by the numeral 82' in Fig. 1ª. After this has been done, then the dough piece is curled by means of the curling member 85 and the coiled up piece of dough firmly molded into a loaf by the pressure board 86 and delivered by the conveyor belt 83 to the pan 87, the position of which to receive the loaves is controlled by suitable means not forming a part of this invention. As result, a loaf of bread is produced that has no dry places therein, no large holes therein, and has a substantially uniform grain throughout its body from end to end and from the center to the crust thereof and without any flour streaks appearing therein.

What I claim is:

1. In a bread molding machine, means for folding sheeted dough pieces crosswise of the direction in which the same were sheeted, comprising a table, a conveyor belt operating over said table receiving sheeted dough pieces crosswise of said belt, stop means between the side edges of said belt cooperating therewith to locate said dough pieces transversely of said belt, and means mounted on said table for guiding said belt to dispose spaced portions thereof parallel to said table and deflect a portion thereof between said spaced portions out of parallelism to said table with the marginal portions thereof in adjacency, said guiding means comprising guide rollers engaging the top face of said belt mounted to rotate about axes parallel to said table.

2. In a bread molding machine, means for folding sheeted dough pieces crosswise of the direction in which the same were sheeted, comprising a table, a conveyor belt operating over said table receiving sheeted dough pieces crosswise of said belt, stop means between the side edges of said belt cooperating therewith to locate said dough pieces transversely of said belt, and means mounted on said table for guiding said belt to dispose spaced portions thereof parallel to said table and deflect a portion thereof between said spaced portions out of parallelism to said table with the marginal portions thereof in adjacency, said guiding means comprising guide rollers engaging the under face of said belt mounted to rotate about axes perpendicular to, and extending at opposite oblique angles to said table, and guide rollers engaging the top face of said belt mounted to rotate about axes parallel to said table.

3. In a bread molding machine, means for folding sheeted dough pieces crosswise of the direction in which the same were sheeted, comprising a table, a conveyor belt operating over said table receiving sheeted dough pieces crosswise of said belt, stop means between the side edges of said belt cooperating therewith to locate said dough pieces transversely of said belt, said table having a slot therein extending lengthwise of said belt thereunder, and means mounted on said table in transverse alignment with and extending over said slot for guiding said belt to direct the marginal portions thereof toward each other.

4. In a bread molding machine, means for folding sheeted dough pieces crosswise of the direction in which the same were sheeted, comprising a table, a conveyor belt operating over said table receiving sheeted dough pieces crosswise of said belt, stop means between the side edges of said belt cooperating therewith to locate said dough pieces transversely of said belt, said table having a slot therein extending lengthwise of said belt thereunder, and means mounted on said table in transverse alignment with said slot comprising a plurality of rollers engaging said belt in transverse alignment with and between the longitudinal edges of said slot and rotating about axes perpendicular to said table.

References Cited in the file of this patent

UNITED STATES PATENTS

| | | |
|---|---|---|
| 1,176,648 | Callow et al. | Mar. 21, 1916 |
| 1,792,443 | Peters | Feb. 10, 1931 |
| 2,017,605 | Peters | Oct. 15, 1935 |
| 2,246,477 | Attaway et al. | June 17, 1941 |
| 2,261,043 | Winfree, Jr. | Oct. 28, 1941 |
| 2,320,797 | Robinson | June 1, 1943 |

FOREIGN PATENTS

| | | |
|---|---|---|
| 183,848 | Great Britain | July 26, 1923 |
| 682,700 | Germany | Oct. 20, 1939 |